(No Model.) 2 Sheets—Sheet 1.
D. W. BRICKER.
CULTIVATOR AND FERTILIZER DISTRIBUTER.
No. 494,457. Patented Mar. 28, 1893.
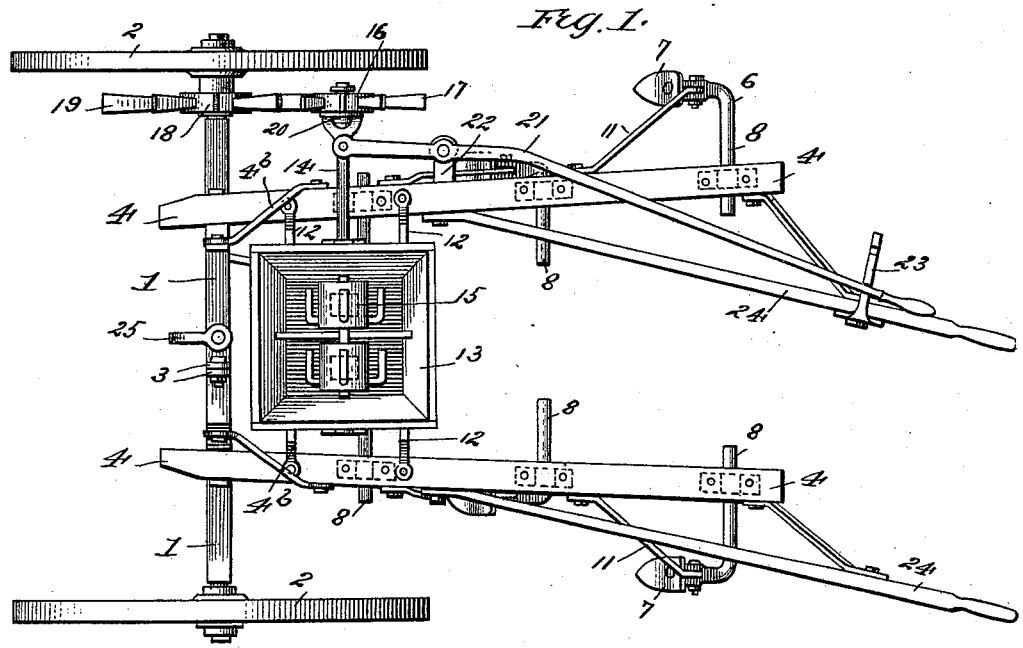
Fig. 1.
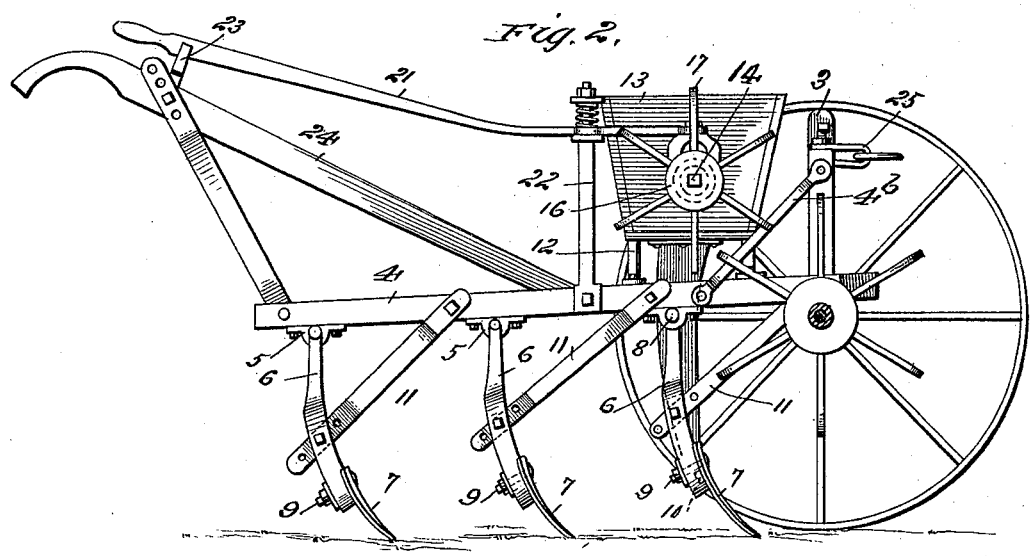
Fig. 2.
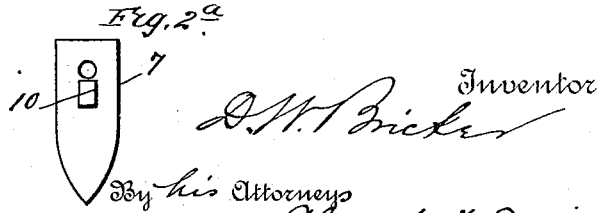
Fig. 2ª.
Witnesses
E. J. Hussin
W. Harry Muzzy
Inventor
D. W. Bricker
By his Attorneys
Alexander & Davis
THE NORRIS PETERS CO., PHOTO-LITHO., WASHINGTON, D. C.

(No Model.) 2 Sheets—Sheet 2.
D. W. BRICKER.
CULTIVATOR AND FERTILIZER DISTRIBUTER.
No. 494,457. Patented Mar. 28, 1893.
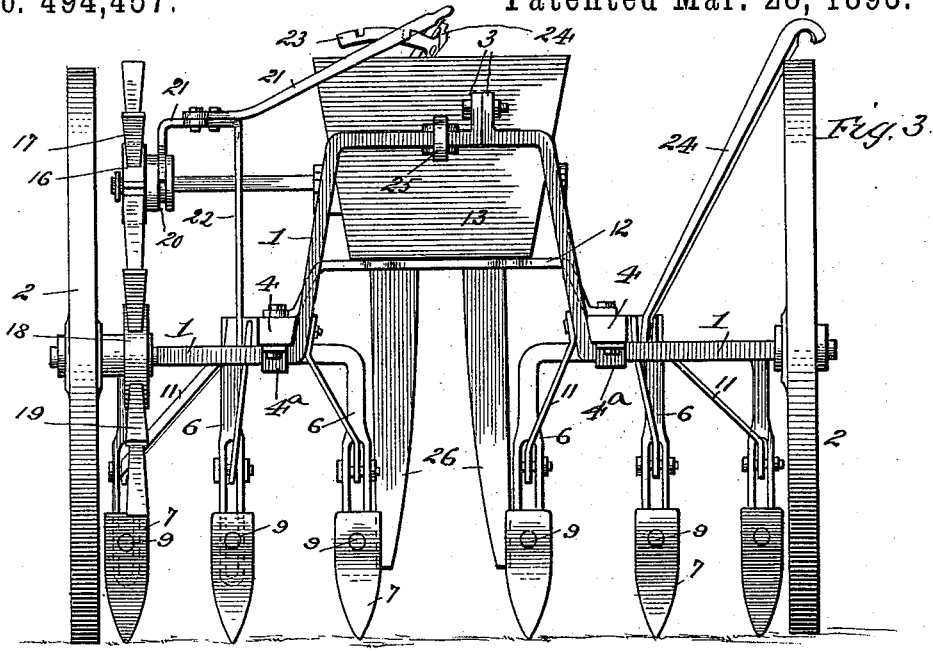
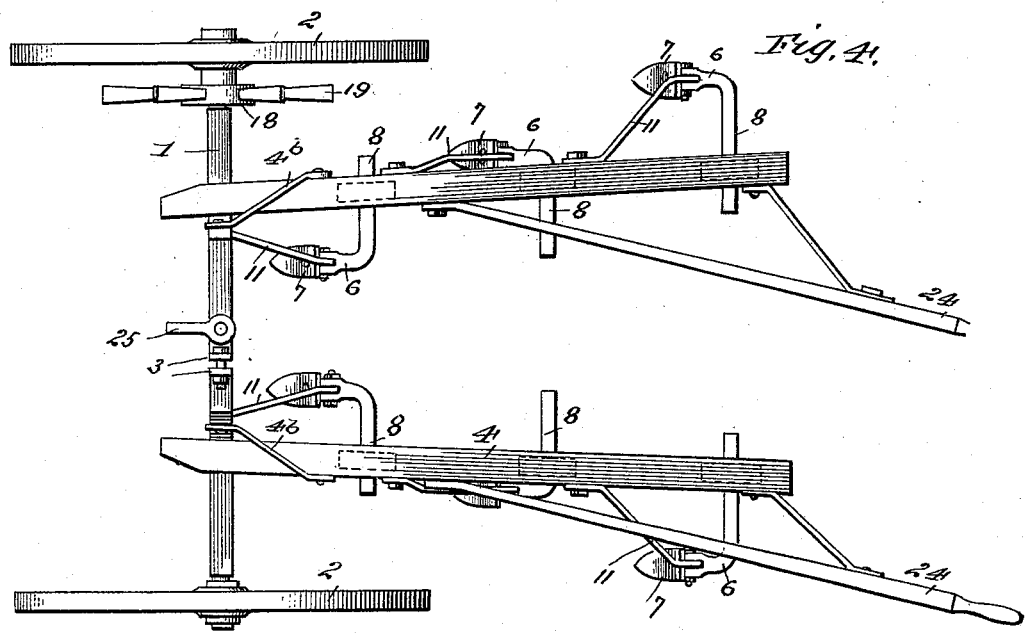
Witnesses
Inventor
D. W. Bricker
By his Attorneys
Alexander Davis

United States Patent Office.

DAVID W. BRICKER, OF POLKTON, NORTH CAROLINA.

CULTIVATOR AND FERTILIZER-DISTRIBUTER.

SPECIFICATION forming part of Letters Patent No. 494,457, dated March 28, 1893.

Application filed May 2, 1892. Serial No. 431,444. (No model.)

*To all whom it may concern:*

Be it known that I, DAVID W. BRICKER, a citizen of the United States, residing at Polkton, in the county of Anson and State of North Carolina, have invented certain new and useful Improvements in Cultivators and Fertilizer-Distributers, of which the following is a specification, reference being had therein to the accompanying drawings.

This invention relates to a new and improved combined cultivator and fertilizer distributer, and it has for its object to provide a machine of simple construction whose parts may be easily and readily adjusted to meet the varied requirements of plant cultivation.

It also has for its object to provide a machine of light draft, and one over which the horse or draft animal attached, has little or no power to guide, the operator having entire control of the machine.

Its further object is to provide means whereby the draft animal may walk between the rows of plants while the machine itself straddles the rows, all of which will more fully hereinafter appear.

In the drawings: Figure 1 is a plan view of my improved machine. Fig. 2 is a side elevation. Fig. 2ª is a detail view of one of the shovels. Fig. 3 is a front elevation. Fig. 4 is a plan view with the fertilizer distributing mechanism removed.

Referring to the various parts by numerals, 1 designates an arched axle, on the outer ends of which are mounted the transporting wheels 2. This axle is divided at the arched portion on one side of its center and is provided with the upturned lugs or flanges 3 through which a bolt is passed to secure the two portions of the axle together.

Secured on the axle 1, at the base of the arch, and on each side thereof are the rearwardly-extending diverging beams 4, 4. These beams are secured to the axle by means of the boxes 4ª which are secured to the underside and embrace the axle 1. They are also secured to the arch by braces 4ᵇ 4ᵇ which are secured to the arch and to the outer-sides of the beams. To the under side of the beams are secured by means of the boxes 5 the standards 6, to the lower ends of which are secured the cultivator teeth 7. The standards 6 are formed with a horizontal arm 8, at their upper ends. These horizontal arms are securely held in the boxes 5 and are adjustable laterally therein in order to adjust the machine for the cultivation of plants set in narrow or wide rows, as desired. The lower ends of the standards are slotted as shown and the cultivator teeth 7 are adjustably secured to the standards by means of the bolts 9 which pass through the teeth and the slot in the standard and are provided with washers and nuts at their rear ends. By this arrangement the cultivator teeth may be raised or lowered on the standards, for shallow or deep cultivation, when desired. On the rear side of the teeth 7 are formed the lugs 10, which enter the slots in the standards 6 and prevent the teeth turning on the bolts 9 during operation. In the upper ends of the slots of standards 6, are secured the lower ends of upwardly and forwardly-extending braces. The upper ends of these braces 11 are secured to the beam 4, and their lower ends are provided with a series of holes, in order that the said braces may be secured to the standards 6, in their adjusted positions.

Secured on the upper side of the beams 4—4 near their forward ends are two transverse bars 12—12 which support the fertilizer hopper 13. Within this hopper, on a transverse shaft 14, is mounted a stirrer 15 of any suitable construction. The shaft 14 is extended at one of its ends beyond the hopper, and has loosely mounted on its squared outer end the sliding wheel 16 which is provided with a suitable number of radial teeth or projections 17. This wheel 16 is revolved, and with it the shaft 14 and stirrer 15, by means of a wheel 18 secured on the inner side of one of the adjacent wheels 2. This wheel 18 is provided with radial teeth or projections 19 which as the said transporting wheel revolves engage the teeth of wheel 16 and cause the same to revolve, as is evident.

The hub of the wheel 16 is extended on its inner side and said extension is provided with an annular groove 20, in which fits the forked end of a rearwardly extending lever 21. This lever 21 is pivoted on a standard 22 whose lower end is bolted to the adjacent beam 4, and its rear end engages a notched segment 23 which is secured on the adjacent handles of the cultivator.

When it is desired to throw the fertilizer dropping mechanism out of operation, the rear end of lever 21, is thrown outwardly, drawing the forward end inwardly and with it the wheel 16 thereby throwing the teeth of wheel 16 out of gear with wheel 18 as is manifest.

The handles 24 are secured to the beams 4, 4, and extend rearwardly and upwardly, and incline to one side as shown, in order that the operator may walk between the rows, while the cultivator straddles the rows, and have entire control of the machine. The handles are suitably braced and supported as shown.

To the center of the arch of axle 1 is pivoted a draft clevis 25. The object of pivoting this clevis is that the draft animal may walk between the rows while the cultivator straddles the rows, the draft animal having little or no guiding power over the machine. The further object of attaching the draft clevis to the arch of the axle 1, is to secure a light draft cultivator, as it is evident that by attaching the draft to the axle above the center of the transporting wheels the draft animal exerts leverage, the fulcrum of which is the center of the wheels, the tendency of which is to raise the beams 4—4 and the cultivator teeth attached, whereby the draft instead of forcing the teeth into the ground will tend to raise them.

From the under side of fertilizer hopper 13 extend the downwardly extending tubes 26, which carry the fertilizer to the forward teeth 7, and deposit it just in the rear of them as shown in Figs. 2 and 3. These tubes may be provided for all the teeth 7, if desired, in order that all the cultivated ground may be fertilized.

In Fig. 4, is shown a plan view of my machine with the fertilizer distributing mechanism removed and the bolt 3 which secures the two portions of the arch-axle together loosened in order that when the machine is used as a cultivator alone it will adjust itself to the unevenness of the ground, the pivotal connection enabling one side of the machine to adjust itself to the undulations of the ground independently of the other.

Having thus fully described my invention, what I claim, and desire to secure by Letters Patent, is—

1. The combination of a cultivator beam, a standard 6 carrying a cultivator-shovel at its lower end, said standard being provided with a lateral cylindrical arm 8 at its upper end, means for securing this arm adjustably and pivotally to the cultivator beam and a brace 11, its upper end secured to the cultivator beam and its lower end adjustably secured to the standard 6, whereby the cultivator shovel may be positively adjusted forwardly and backwardly and laterally in either direction substantially as described.

2. The combination of an arched axle mounted on wheels and constructed of two sections pivoted together at the upper part of the arch, rearwardly extending cultivator beams connected to the axle on each side of the arch, a series of standards having cultivator shovels at their lower ends carried by said beams, said standards being independently adjustable laterally, forwardly and rearwardly, means for securing said standards in their adjusted positions, and a laterally swinging draft clevis pivotally connected directly to the arch at its middle; substantially as described.

In testimony whereof I affix my signature in presence of two witnesses.

DAVID W. BRICKER.

Witnesses:
W. D. WEBB,
J. T. TEAL.